United States Patent
Fukao

(10) Patent No.: US 8,151,434 B2
(45) Date of Patent: Apr. 10, 2012

(54) METHOD OF GRINDING A BRAKE DISK MOUNTING SURFACE WITH AN ANNULAR RECESS USING AN INCLINED GRINDING WHEEL

(75) Inventor: Takeshi Fukao, Kashiwara (JP)

(73) Assignee: JTEKT Corporation, Osaka-Shi, Osaka (JP)

(*) Notice: Subject to any disclaimer, the term of this patent is extended or adjusted under 35 U.S.C. 154(b) by 593 days.

(21) Appl. No.: 12/225,700

(22) PCT Filed: Mar. 28, 2007

(86) PCT No.: PCT/JP2007/056613
§ 371 (c)(1),
(2), (4) Date: Sep. 26, 2008

(87) PCT Pub. No.: WO2007/114153
PCT Pub. Date: Oct. 11, 2007

(65) Prior Publication Data
US 2009/0151164 A1    Jun. 18, 2009

(30) Foreign Application Priority Data
Mar. 29, 2006  (JP) .............................. P2006-090928

(51) Int. Cl.
*B24B 7/16* (2006.01)
*B24B 19/28* (2006.01)

(52) U.S. Cl. ......... 29/557; 29/898.13; 451/63; 451/541; 451/548; 301/105.1

(58) Field of Classification Search .................. 384/544, 384/389; 301/105.1; 29/898.04, 898.066, 29/898.07, 898.13, 557; 451/63, 451.52, 451/541, 548, 52
See application file for complete search history.

(56) References Cited

U.S. PATENT DOCUMENTS

| | | | | |
|---|---|---|---|---|
| 2,118,003 A | * | 5/1938 | Bigelow | 451/276 |
| 2,239,639 A | * | 4/1941 | Amidon | 451/220 |
| 2,336,796 A | * | 12/1943 | Mandeville et al. | 451/269 |
| 3,456,401 A | * | 7/1969 | Kushmuk | 451/435 |

(Continued)

FOREIGN PATENT DOCUMENTS
EP    1 486 289 A    12/2004
(Continued)

OTHER PUBLICATIONS
European Search Report dated Dec. 29, 2009.
(Continued)

*Primary Examiner* — David Bryant
*Assistant Examiner* — Jason L Vaughan
(74) *Attorney, Agent, or Firm* — McGinn IP Law Group, PLLC

(57) ABSTRACT

A brake disk mounting surface is ground by bringing it into contact with an annular grinding wheel, while an inner ring having the brake disk mounting surface is rotated around its center axis, in a state where a part of the annular grinding wheel overlaps with a recess over an entire region of the annular grinding wheel in a radial direction, and in a state where a grinding surface of the annular grinding wheel is inclined with respect to the brake disk mounting surface so that a distance between the brake disk mounting surface and the annular grinding wheel grows larger in a direction toward an outer edge of the brake disk mounting surface.

14 Claims, 3 Drawing Sheets

U.S. PATENT DOCUMENTS

| | | | | |
|---|---|---|---|---|
| 3,724,137 | A * | 4/1973 | Hofelt et al. | 451/254 |
| 4,361,988 | A * | 12/1982 | Gramlich | 451/63 |
| 4,766,702 | A * | 8/1988 | Kinner | 451/63 |
| 4,825,596 | A * | 5/1989 | Kinner | 451/14 |
| 5,430,926 | A * | 7/1995 | Hartford | 29/434 |
| 5,472,373 | A * | 12/1995 | Wolters | 451/259 |
| 5,480,007 | A * | 1/1996 | Hartford | 188/18 A |
| 5,507,686 | A * | 4/1996 | Wolters | 451/63 |
| 5,842,388 | A * | 12/1998 | Visser et al. | 82/1.11 |
| 5,899,305 | A * | 5/1999 | Austin et al. | 188/218 XL |
| 5,951,378 | A * | 9/1999 | Miller et al. | 451/58 |
| 6,071,180 | A * | 6/2000 | Becker | 451/63 |
| 6,139,405 | A * | 10/2000 | Becker | 451/63 |
| 6,415,508 | B1 * | 7/2002 | Laps | 29/894.362 |
| 6,619,163 | B2 * | 9/2003 | Tanio et al. | 82/112 |
| 6,702,398 | B2 * | 3/2004 | Laps | 301/105.1 |
| 6,880,898 | B2 * | 4/2005 | Nakamura et al. | 301/105.1 |
| 7,083,504 | B2 | 8/2006 | Fukao et al. | |
| 7,226,344 | B2 | 6/2007 | Fukao et al. | |
| 7,524,238 | B2 | 4/2009 | Fukao et al. | |
| 2003/0025385 | A1 | 2/2003 | Morimoto et al. | |
| 2005/0164611 | A1 | 7/2005 | Fukao et al. | |
| 2005/0184582 | A1 | 8/2005 | Morimoto et al. | |
| 2006/0033381 | A1 * | 2/2006 | Suma | 301/105.1 |
| 2006/0234608 | A1 | 10/2006 | Fukao et al. | |

FOREIGN PATENT DOCUMENTS

| | | |
|---|---|---|
| JP | 63-300849 A | 12/1988 |
| JP | 2000-288881 A | 10/2000 |
| JP | 2001-129750 A | 5/2001 |
| JP | 2002-535152 A | 10/2002 |
| JP | 2003-025802 A | 1/2003 |
| JP | 2003-343580 | 12/2003 |
| JP | 2005-001061 A | 1/2005 |
| JP | 2005-140192 A | 6/2005 |

OTHER PUBLICATIONS

International Search Report—FormPCT/ISA/210 (English and Japanese).

* cited by examiner

METHOD OF GRINDING A BRAKE DISK MOUNTING SURFACE WITH AN ANNULAR RECESS USING AN INCLINED GRINDING WHEEL

TECHNICAL FIELD

The present invention relates to a method of producing a rolling bearing device for a wheel such as a hub unit, for example.

BACKGROUND ART

In a rolling bearing device for a wheel, it has been found out that in case where a brake disk mounting surface of the rolling bearing device for the wheel is inclined with respect to a plane which is perpendicular to a rotation center axis of the rolling bearing device for the wheel, mounting of a brake disk to a brake disk mounting surface becomes unstable and distortion of the brake disk is increased, and a strange noise is likely to occur when brake is put on. Moreover, it is said that a strange noise is most likely to occur, particularly in case where the brake disk mounting surface is in a center convex shape in which the brake disk mounting surface protrudes toward a brake disk side with respect to the plane perpendicular to the rotation center axis of the bearing device in an area close to the center axis. Speaking ideally, it is preferable that an entirety of the brake disc mounting surface may be aligned with the plane perpendicular to the rotation center axis. If not, however, it may be desirable to produce the bearing device such a manner that the brake disk mounting surface may be formed in a concave shape (a center concave shape) in which the area close to the center axis is dented so as to be apart from the brake disk side, but not in a center convex shape, has been more and more increased. As described above, the request that the brake disk mounting surface may be formed in a plane perpendicular to the rotation center axis but not in a center convex shape, or in a non center convex shape, that is, a center concave shape, has been more and more increased.

As a conventional method of producing a rolling bearing device for a wheel, there is a disclosure of Japanese Patent Publication No. JP-A-2005-1061 (Patent Document 1). In this method of producing the rolling bearing device for the wheel, in a state where a center axis of the rolling bearing device for the wheel is directed in a vertical direction after an outer ring, an inner ring, and a plurality of balls have been assembled, a flange part formed at one end of the outer ring at a lower side in the vertical direction is fixed to a securing table of the rolling bearing device for the wheel. Then, by rotating a spindle incorporated in one end of the inner ring at an upper side in the vertical direction, a flange surface of a flange part which is formed at one end of the inner ring at an upper side in the vertical direction is rotated to bring this flange surface which is rotating into contact with a rotary grinding wheel, whereby the flange surface of the inner ring is ground.

However, in the above described conventional method of producing the rolling bearing device for the wheel, there is a problem that it is difficult to vary a position of the rotary grinding wheel according to a grinding position of the flange surface, even though the flange surface is intended to be ground in a determined center concave shape, and hence, it is difficult to enhance shaping accuracy of the flange surface with respect to the determined shape, when the flange surface is formed in a center concave shape.

Patent Document 1: Japanese Patent Publication No. 2005-1061

DISCLOSURE OF THE INVENTION

Problems that the Invention is to Solve

In view of the above, it is an object of the invention to provide a method of producing a rolling bearing device for a wheel in which a brake disk mounting surface of the rolling bearing device for the wheel can be reliably formed in, a non center convex shape, and shaping accuracy of the brake disk mounting surface after production is enhanced.

Means for Solving the Problems

In order to solve the above described problems, there is provided, according to the invention, a method of producing a rolling bearing device for a wheel including an outer ring, an inner ring, and a plurality of rolling elements, the outer ring or the inner ring being provided with a brake disk mounting flange having a brake disk mounting surface to which a brake disk is directly or indirectly mounted, characterized in that the method includes a bearing device and grinding wheel preparing step for preparing the rolling bearing device for the wheel in a state where the outer ring, the inner ring and a plurality of the rolling elements are assembled, and an annular recess is formed on the brake disk mounting surface, and an annular grinding wheel having a smaller width than a width of the recess in a radial direction, and a brake disk mounting surface grinding step for grinding the brake disk mounting surface by bringing the brake disk mounting surface into contact with the annular grinding wheel, while the outer ring or the inner ring having the brake disk mounting surface is rotated around a center axis of the inner ring or the outer ring, in a state where the annular grinding wheel has a part overlapping with the recess over an entire region of the annular grinding wheel in the radial direction from an outer periphery to an inner periphery of the annular grinding wheel, in a state where the annular grinding wheel and a region inside the annular grinding wheel do not overlap with the region inside the annular recess, and in a state where a grinding surface of the annular grinding wheel is inclined with respect to the brake disk mounting surface so that a distance between the grinding surface and the brake disk mounting surface grows larger in a direction from the annular recess of the brake disk mounting surface toward an outer edge of the brake disk mounting surface.

According to the invention, the brake disk mounting surface is ground by bringing the brake disk mounting surface into contact with the annular grinding wheel, while the outer ring or the inner ring having the brake disk mounting surface is rotated around its center axis, in a state where the grinding surface of the annular grinding wheel is inclined with respect to the brake disk mounting surface so that the distance between the brake disk and the annular grinding wheel grows larger in a direction toward the outer edge of the brake disk mounting surface. Therefore, the brake disk mounting surface can be ground mainly at a part close to its center (a part closer to the recess), and it is possible to make the brake disk mounting surface as a flat surface perpendicular to the rotation center axis. Even though the perpendicular flat surface cannot be obtained, the brake disk mounting surface is formed in a center concave shape, but never formed in a center convex shape, and hence, the brake disk mounting surface can be easily formed in the non center convex shape. As the results, the brake disk can be stably mounted to the brake disk mounting surface, and distortion of the brake disk is reduced. Accordingly, it is possible to fix the brake disk to the brake disk mounting surface reliably and stably, and it is possible to restrain a strange noise from being issued from the brake disk when brake is put on.

Moreover, according to the invention, the brake disk mounting surface is ground in a state where a part of the annular grinding wheel overlaps with the recess over the entire region of the annular grinding wheel in the radial direction from the outer periphery to the inner periphery of the annular grinding wheel. Therefore, even though a part outward in the radial direction of the annular grinding wheel has collapsed in shape due to abrasion, the shape of the part which has collapsed in shape will not be transferred to the brake disk mounting surface. In this manner, the brake disk mounting surface can be ground in a determined non center convex shape, and shaping accuracy of the brake disk mounting surface can be enhanced.

Further, according to the invention, the brake disk mounting surface is ground in a state where the outer ring and the inner ring and a plurality of the rolling elements are assembled. Therefore, flatness and straightness of the brake disk mounting surface with respect to an axis of the rolling bearing device for the wheel can be enhanced.

Specifically, in case where the inner ring, the outer ring, and the rolling elements are assembled after the brake disk mounting surface has been ground, accuracy of the flatness and the straightness of the brake disk mounting surface with respect to the axis of the rolling bearing device for the wheel is deteriorated, because respective tolerances (errors) of the inner ring, the outer ring and the rolling elements are added. To the contrary, in this invention, because the brake disk mounting surface is ground in a state where the inner ring, the outer ring, and a plurality of the rolling elements are assembled, the flatness and straightness of the brake disk mounting surface with respect to the axis of the rolling bearing device for the wheel can be remarkably enhanced.

According to the method of producing the rolling bearing device for the wheel of the invention, the brake disk mounting surface is ground in a state where the grinding surface of the annular grinding wheel is inclined with respect to the brake disk mounting surface so that the distance between the brake disk and the annular grinding wheel grows larger in a direction toward the outer edge of the brake disk mounting surface. Therefore, the brake disk mounting surface can be ground mainly in a part close to its center, and the brake disk mounting surface can be easily formed in the non center convex shape. As the results, the brake disk can be mounted to the brake disk mounting surface reliably and stably, and distortion of the brake disk is reduced. Accordingly, it is possible to restrain strange noise from being issued from the brake disk.

Still further, according to the method of producing the rolling bearing device for the wheel of the invention, the brake disk mounting surface is ground in a state where a part of the annular grinding wheel overlaps with the recess over the entire region of the annular grinding wheel in the radial direction from the outer periphery to the inner periphery of the annular grinding wheel. Therefore, the collapse in shape of the annular grinding wheel will not be transferred to the brake disk mounting surface, but the brake disk mounting surface can be ground in the determined non center convex shape, and hence, shaping accuracy of the brake disk mounting surface can be enhanced.

Further, according to the method of producing the rolling bearing device for the wheel of the invention, the brake disk mounting surface is ground in a state where the outer ring and the inner ring and a plurality of the rolling elements are assembled. Therefore, as compared with a method in which the inner and outer ring and the rolling elements are assembled after the brake disk mounting surface has been ground, flatness and straightness of the brake disk mounting surface with respect to the axis of the rolling bearing device for the wheel can be enhanced.

BEST MODE FOR CARRYING OUT THE INVENTION

Figure 1:
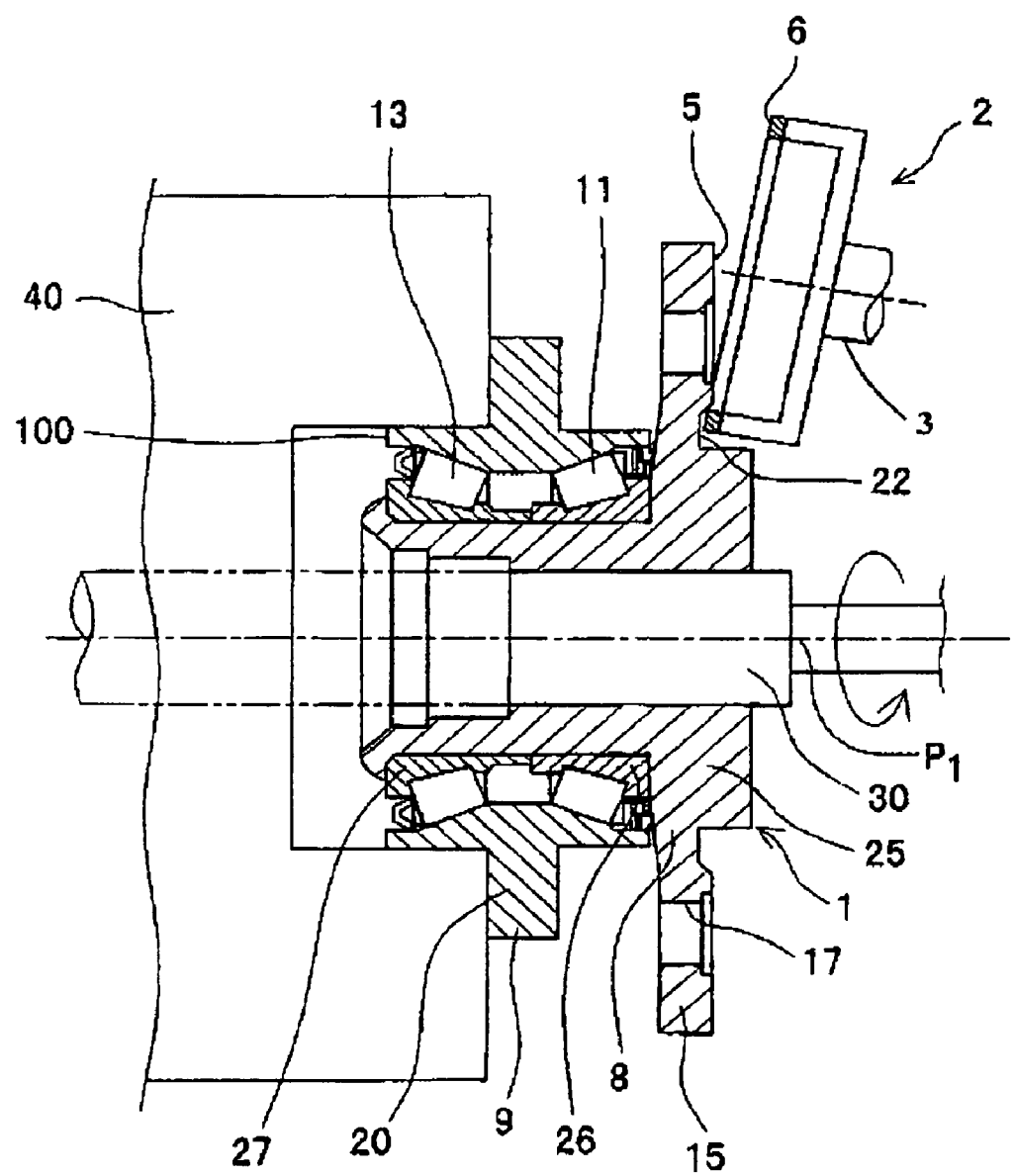
FIG. 1 is a view showing a rolling bearing device for a wheel and a grinding member during production while a method of producing a rolling bearing device for a wheel in one embodiment of the invention is carried out.

Now, the invention will be described in detail, referring to the drawings.

FIG. 1 is a view showing a rolling bearing device 1 for a wheel and a grinding member 2 during production while a method of producing a rolling bearing device for a wheel in one embodiment of the invention is carried out. More particularly, FIG. 1 is the view showing the rolling bearing device 1 for the wheel and an annular grinding wheel 6 before grinding, while the grinding member 2 is moved close to a brake disk mounting surface 5 of the rolling bearing device 1 for the wheel which has been prepared in a step for preparing the rolling bearing device for the wheel.

The rolling bearing device 1 for the wheel includes an inner ring 8, an outer ring 9, and taper rollers 11, 13 as an example of rolling elements.

The inner ring 8 includes an inner shaft 25, a first inner ring 26, and a second inner ring 27. The inner shaft 25 is fitted over an outer periphery of a rotation shaft 30, and has a brake disk mounting flange 15 which has a disc-like shape spreading in a radial direction and to which a brake disk (not shown) is directly or indirectly mounted. The brake disk mounting flange 15 has a shape of a hollow disc. A plurality of bolt through holes 17 are formed concentrically in this brake disk mounting flange 15. Bolts (not shown) for tightly securing the brake disk (not shown) to the brake disk mounting surface 5 after ground are adapted to be inserted into these bolt through holes 17. The brake disk mounting surface 5 is formed on a part at an outer diameter side of an end surface of the brake disk mounting flange 15 outward in the axial direction. An annular recess (a relief) 22 is formed inside in a radial direction of the brake disk mounting surface 5.

The first inner ring 26 and the second inner ring 27 are fitted over and fixed to an outer peripheral surface of the inner shaft 25 at a position inward than the brake disk mounting flange 15 in the axial direction so as to be in contact with each other in the axial direction. A first tapered raceway surface is formed on an outer periphery of the first inner ring 26, and a second tapered raceway surface is formed on an outer periphery of the second inner ring 27. In addition, a cylindrical raceway surface is formed on an outer peripheral surface of an end part of the first inner ring 26 adjacent to the second inner ring 27 and on an outer peripheral surface of an end part of the second inner ring 27 adjacent to the first inner ring 26. A plane extending from a contact surface between the first inner ring 26 and the second inner ring 27 passes the cylindrical raceway surface.

The outer ring 9 has a vehicle body mounting flange 20 on its one end in the axial direction, the mounting flange 20 having a disc-like shape spreading in the radial direction. A plurality of bolt through holes (not shown) for mounting the vehicle body mounting flange 20 to a vehicle body are concentrically formed in this disc-shaped vehicle body mounting flange 20.

A plurality of the taper rollers 11 are arranged between the first inner ring 26 and the outer ring 9, and a plurality of the taper rollers 13 are arranged between the second inner ring 27 and the outer ring 9.

The grinding member 2 has a cup-like shape. An annular grinding wheel 6 is fixed to an annular end surface of the grinding member 2 in the axial direction at an opening side thereof. In an exemplary embodiment grinding member 2 is connected to rotation shaft 3. A width in the radial direction of the annular grinding wheel 6 is made smaller than a width in the radial direction of the recess 22.

In the above described structure, the rolling bearing device for the wheel is produced as follows.

As a first step, the step for preparing the rolling bearing device and the grinding wheel is conducted. In this rolling bearing device and grinding wheel preparing step, the rolling bearing device for the wheel (a hub unit) which is shown by numeral 1 in FIG. 1 and has the recess 22 formed on the brake disk mounting surface 5 is prepared, by assembling the inner ring 8 provided with the recess 22 on the brake disk mounting surface 5, the outer ring 9, and the taper rollers 11, 13. At the same time, the annular grinding wheel 6 which has the smaller width than the width of the recess 22 in the radial direction is prepared.

Then, a step for grinding the brake disk mounting surface is conducted. In this brake disk mounting surface grinding step, an end surface outward in the axial direction of the vehicle body mounting flange 20 of the outer ring 9 of the rolling bearing device 1 for the wheel which has been prepared in the rolling bearing device for the wheel preparing step, and an outer peripheral surface thereof positioned more outward in the axial direction than the end surface are secured by an inner peripheral surface and an end surface of a cup-shaped jig 40, whereby the outer ring 9 is fixed at a determined position so that the outer ring 9 may become a reference of grinding work.

Figure 2:
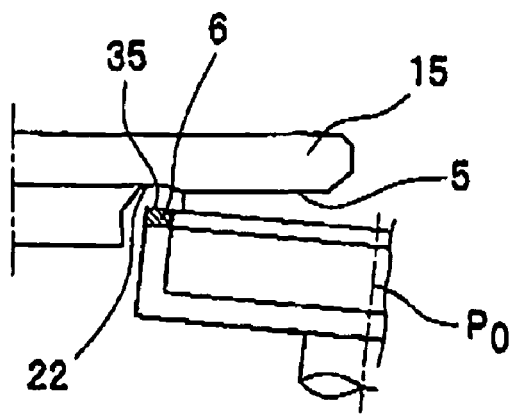
FIG. 2 is an enlarged view of a part surrounding a recess.

As shown in FIG. 2 which is an enlarged view of a part surrounding the recess 22, a grinding surface 35 of the annular grinding wheel 6 is inclined with respect to the brake disk mounting surface 5 so that the annular grinding wheel 6 may have a part overlapping with the recess 22 over an entire region thereof in the radial direction from an outer periphery (an outer edge) to an inner periphery (an inner edge) of the annular grinding wheel 6, so that the annular grinding wheel 6 and a region inside the annular grinding wheel 6 may not overlap with a region inside the recess 22 (so that the annular grinding wheel 6 may not be positioned inside the recess 22 in the radial direction), and so that a center axis P0 of the annular grinding wheel 6 may be at an acute angle with respect to a center axis (P1 in FIG. 1) of the inner ring 8, and a distance between the brake disk mounting surface 5 and the annular grinding wheel 6 may grow larger in a direction from the recess 22 (a center part) to an outer periphery (an outer edge) of the brake disk mounting surface 5. In this state, the brake disk mounting surface 5 is brought into contact with the annular grinding wheel 6 while the inner ring 8 is rotated around the center axis P1 thereof, whereby the brake disk mounting surface 5 is ground.

Figure 3:
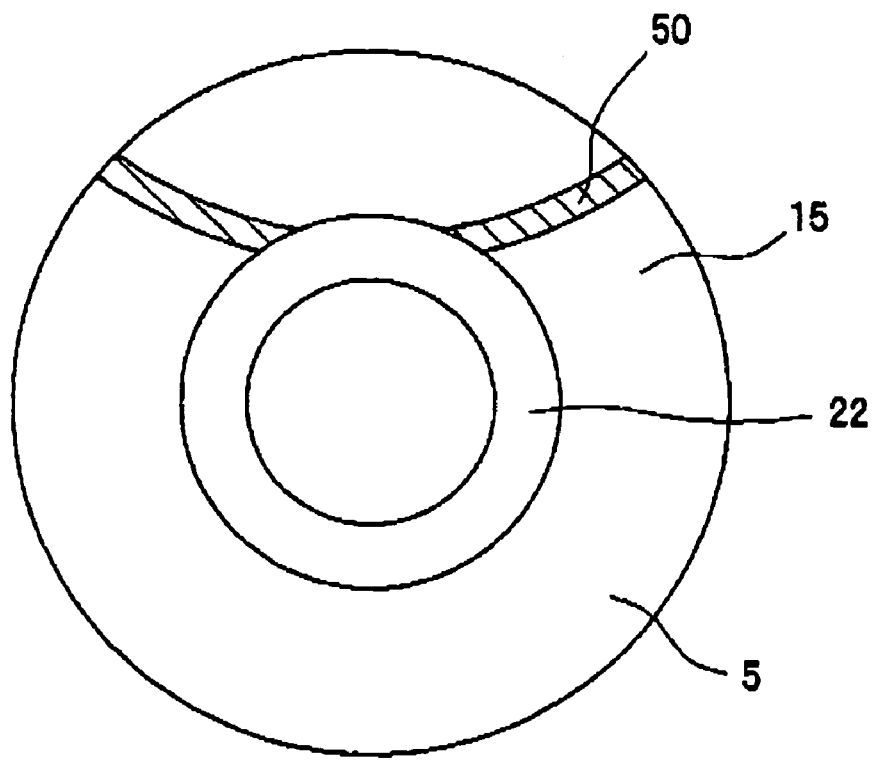
FIG. 3 is a view showing a part of a brake disk mounting surface in contact with an annular grinding wheel at a certain moment while the brake disk mounting surface is ground.

FIG. 3 is a view showing a region of the brake disk mounting surface 5 in contact with the annular grinding wheel 6, at a certain moment during the grinding work of the brake disk mounting surface 5. In FIG. 3, numeral 22 designates the annular recess, and numeral 50 designates the region of the brake disk mounting surface 5 which is in contact with the annular grinding wheel 6. As shown in FIG. 3, it is found that a part of the annular grinding wheel 6 overlaps with the recess 22 over the entire region thereof in the radial direction.

Figure 4:
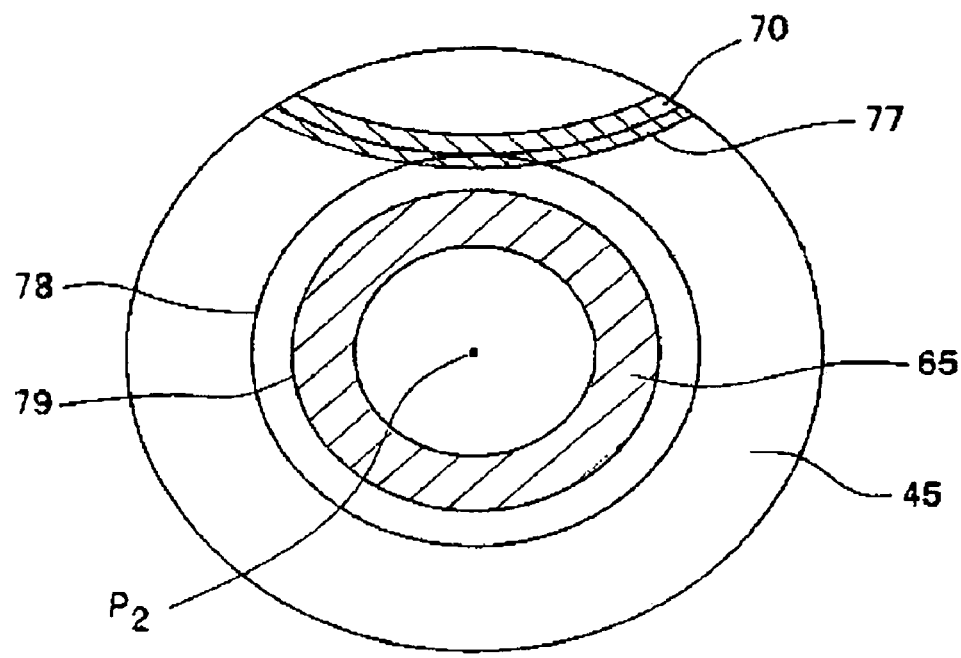
FIG. 4 is a view for explaining that a collapse in shape of the annular grinding wheel is transferred to the brake disk mounting surface, when the annular grinding wheel does not at all overlap with the recess.
Figure 5:
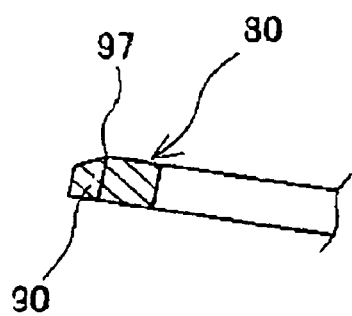
FIG. 5 is a view showing an example of the annular grinding wheel having a collapse in shape.

FIG. 4 is a view for explaining that a collapse in shape of the annular grinding wheel is transferred to a brake disk mounting surface 45 when the annular grinding wheel does not at all overlap with a recess 65. FIG. 5 is a view showing an example of an annular grinding wheel 80 which has a collapse in shape.

In FIG. 4, a hatched region 65 represents a region of the recess which is formed on the brake disk mounting surface 45. A hatched region 70 represents a region of the brake disk mounting surface 45 which is in contact with the annular grinding wheel 80 (See FIG. 5). In FIG. 4, an arc 77 represents a part of the brake disk mounting surface 45 which is in contact with a most protruding part 97 (See FIG. 5) of the grinding wheel which has been formed with a collapse in shape occurred in an outer part in the radial direction of the grinding wheel due to abrasion. Reference numeral 78 designates a circle which is concentric with the brake disk mounting surface 45 around a center axis P2, and in contact with the arc 77.

In FIG. 4, the most protruding part 97 will not come into contact with a region enclosed between the circle 78 and a circle 79 which represents an outside edge in the radial direction of the recess 65 (not including the circle 78), during the grinding work (they do not come into contact with each other due to their positional relation). Therefore, in the above described enclosed region, a shape of a part 90 of the annular grinding wheel 80 in which a collapse in shape has occurred (See FIG. 5) during the grinding work is transferred, or the enclosed region will not be ground at all, because the enclosed region cannot be brought into contact with the annular grinding wheel 80. As the results, shaping accuracy of the region enclosed between the circle 78 and the circle 79 on the brake disk mounting surface 45 is deteriorated.

By contrast, in the above described embodiment, a part of the annular grinding wheel (a certain part in a circumferential direction of the annular grinding wheel) overlaps with the recess 22 over the entire region in the radial direction of the annular grinding wheel, as shown in FIG. 3. Therefore, even though a collapse in shape has occurred in the annular grinding wheel due to abrasion, as shown in FIG. 5, the most protruding part of the annular grinding wheel passes the entire region of the brake disk mounting surface 5 except the recess 22, without fail. In this manner, because the entire region of the brake disk mounting surface 5 can be ground with the most protruding part of the grinding wheel where a collapse in shape has not occurred, it is possible to grind the brake disk mounting surface 5 with high accuracy.

According to the method of producing the rolling bearing device for the wheel in the above described embodiment, in a state where the grinding surface 35 of the annular grinding wheel 6 is inclined with respect to the brake disk mounting surface 5 so that the center axis P0 of the annular grinding wheel 6 may be at an acute angle with respect to the center axis P1 of the inner ring 8 (it is also possible to set the center axis P0 at an acute angle with respect to a center axis of the outer ring instead of the inner ring), and the distance between the brake disk mounting surface 5 and the annular grinding wheel 6 may grow larger in a direction toward the outer edge of the brake disk mounting surface 5, the brake disk mounting surface 5 is ground by bringing the brake disk mounting surface 5 into contact with the annular grinding wheel 6, while rotating the inner ring 8 having the brake disk mounting surface 5 around the center axis P1. Therefore, the brake disk mounting surface 5 can be ground mainly in a part close to its center (a part close to the recess 22), and hence, the brake disk mounting surface 5 can be easily formed in a non center convex shape. As the results, the brake disk can be stably mounted to the brake disk mounting surface 5, and distortion of the brake disk can be reduced, and hence, it is possible to restrain strange noise issued from the brake disk when the brake is put on.

Moreover, according to the method of producing the rolling bearing device for the wheel in the above described embodiment, the brake mounting surface 5 is ground in a state where a part of the annular grinding wheel 6 having the smaller width than the width of the recess 22 in the radial direction overlaps with the recess 22 over the entire region in the radial direction of the annular grinding wheel 6. Therefore, even though a part outward in the radial direction of the annular grinding wheel 6 has collapsed in shape due to abrasion, as shown in FIG. 5, the shape of the part 90 which has collapsed in shape will not be transferred to the brake disk mounting surface 5. In this manner, the brake disk mounting surface 5 can be ground in a determined non center convex shape, and shaping accuracy of the brake disk mounting surface 5 can be enhanced.

Moreover, according to the method of producing the rolling bearing device for the wheel in the above described embodiment, the brake disk mounting surface 5 is ground in a state where the inner ring 8, the outer ring 9 and the taper rollers 11, 13 as the rolling elements are assembled. Therefore, flatness and straightness of the brake disk mounting surface 5 with respect to an axis of the rolling bearing device for the wheel can be enhanced. Specifically, in case where the inner ring, the outer ring, and the rolling elements are assembled after the brake disk mounting surface has been ground, accuracy of the flatness and the straightness of the brake disk mounting surface with respect to the axis of the rolling bearing device for the wheel is deteriorated, because respective tolerances (errors) of the inner ring, the outer ring and the rolling elements are added. To the contrary, in the above described embodiment, because the brake disk mounting surface 5 is ground in a state where the inner ring 8, the outer ring 9 and the taper rollers 11, 13 as the rolling elements are assembled, the flatness and straightness of the brake disk mounting surface 5 with respect to the axis of the rolling bearing device for the wheel can be remarkably enhanced.

Although the brake disk mounting surface 5 is a part of the inner ring 8 in the method of producing the rolling bearing device for wheel in the above described embodiment, the brake disk mounting surface may be a part of the outer ring. Then, it is possible to grind the brake disk mounting surface by rotating the brake disk mounting surface, while the inner ring is fixed and the outer ring is rotated around a center axis of the outer ring.

Moreover, in the method of producing the rolling bearing device for wheel in the above described embodiment, the brake disk mounting surface 5 of the inner ring 8 is ground with the annular grinding wheel 6 by rotating the inner ring 8 while the outer ring 9 is fixed. However, in this invention, it is possible to rotate the inner ring in a state where the outer ring is rotated in the same direction as the inner ring or in the reverse direction, thereby to grind the brake disk mounting surface of the inner ring with the annular grinding wheel which is inclined with respect to the brake disk mounting surface. Alternatively, it is possible to rotate the outer ring, while the inner ring is rotated in the same direction as the outer ring or in the reverse direction, thereby to grind the brake disk mounting surface of the outer ring with the annular grinding wheel which is inclined with respect to the brake disk mounting surface. Still alternatively, it is also possible to grind the brake disk mounting surface while the annular grinding wheel is rotated around the center axis of the annular grinding wheel.

Further, in the method of producing the rolling bearing device for wheel in the above described embodiment, the end surface outward in the axial direction of the vehicle body mounting flange 20 of the outer ring 9 and the outer peripheral surface thereof positioned more outward in the axial direction than the end surface are secured by the cup-shaped jig 40, and these end surface and the outer peripheral surface are set as the reference for working the brake disk mounting surface 5 of the inner ring 8. However, in this invention, it is possible to secure an end surface 100 of the outer ring 9 at the opposite side to the brake disk mounting surface 5 as shown in FIG. 1, by grasping it with a chuck, instead of using the cup-shaped jig 40, and to set the end surface 100 as the reference for working the brake disk mounting surface 5 of the inner ring 8.

Further, although the rolling elements are the tapered rollers 11, 13 in the method of producing the rolling bearing device for wheel in the above described embodiment, the rolling elements may be balls.

The invention claimed is:

1. A method of producing a rolling bearing device for a wheel, wherein the rolling bearing device includes an outer ring, an inner ring, and a plurality of rolling elements, wherein the outer ring or the inner ring is provided with a brake disk mounting flange, wherein the brake disk mounting flange includes a brake disk mounting surface, and wherein the brake disk mounting surface is formed to accept a brake disk directly or indirectly mounted thereto, wherein the method of forming the rolling bearing device comprises:

providing the rolling bearing device for the wheel in a state where the outer ring, the inner ring and the plurality of rolling elements are assembled and an annular recess is formed on the brake disk mounting surface;

providing an annular grinding wheel, the annular grinding wheel including a width smaller than a width of the recess in a radial direction, the annular grinding wheel being inclined with respect to the brake disk mounting surface such that a distance between the grinding surface and the brake disk mounting surface increases in a direction from the annular recess of the brake disk mounting surface toward an outer edge of the brake disk mounting surface;

rotating the outer ring or the inner ring around a center axis of the inner ring or a center axis of the outer ring;

grinding the brake disk mounting surface, wherein the brake disk mounting surface is ground by bringing the brake disk mounting surface into contact with the annular grinding wheel, wherein during the grinding of the brake disk mounting surface a first portion of the annular grinding wheel overlaps the recess over an entire region of the annular grinding wheel in the radial direction from an outer periphery to an inner periphery of the annular grinding wheel, and wherein a second portion of the annular grinding wheel does not overlap the annular recess.

2. The method of producing the rolling bearing device for the wheel according to claim 1, wherein the annular grinding wheel is fixed to an annular end surface of a cylindrical part of a grinding member,
wherein the grinding member comprises a cup shape in cross section,
wherein the grinding member includes a disk-shaped part fitted to a rotation shaft,
wherein the cylindrical part which is provided at an outer peripheral edge of the disk-shaped part, and
wherein the cylindrical part protrudes past the outer edge of the brake disk mounting surface in the axial direction.

3. The method of producing the rolling bearing device for the wheel according to claim 1, wherein the inner ring is provided with the brake disk mounting flange,
wherein an outer peripheral surface of the outer ring is engaged with and fixed to an inner peripheral surface of a jig,
wherein the jig comprises a cup shape in cross section, and
wherein an inner peripheral surface of the inner ring is fitted to and fixed to an outer periphery of a rotation shaft.

4. The method of producing the rolling bearing device for a wheel as claimed in claim 1, wherein the inner ring includes an inner shaft,
wherein the inner shaft includes a shaft part,
wherein the shaft part comprises a cylindrical shape,
wherein the shaft part includes the brake disk mounting flange,
wherein the brake disk mounting flange is disposed at one end of the shaft part in the axial direction,
wherein an inner ring raceway member is engaged with an outer periphery of the shaft part and
wherein the inner ring raceway member includes a raceway surface, and
wherein the raceway surface is disposed on an outer peripheral surface of the inner ring raceway member.

5. The method of producing the rolling bearing device for a wheel as claimed in claim 1, wherein a rotation center axis of the annular grinding wheel is inclined at a predetermined angle with respect to the center axis of the outer ring or the inner ring.

6. The method of producing the rolling bearing device for the wheel according to claim 2, wherein the inner ring includes the brake disk mounting flange,
wherein an outer peripheral surface of the outer ring is engaged with and fixed to an inner peripheral surface of a jig,
wherein the jig comprises a cup shape in cross section, and
wherein an inner peripheral surface of the inner ring is fitted to and fixed to an outer periphery of a rotation shaft.

7. The method of producing the rolling bearing device for the wheel as claimed in claim 2, wherein the inner ring includes an inner shaft,
wherein the inner shaft includes a shaft part,
wherein the shaft part comprises a cylindrical shape,
wherein the shaft part includes the brake disk mounting flange,
wherein the brake disk mounting flange is disposed at one end of the shaft part in the axial direction,
wherein an inner ring raceway member is engaged with an outer periphery of the shaft part,
wherein the inner ring raceway member includes a raceway surface, and
wherein the raceway surface is disposed on an outer peripheral surface of the inner ring raceway member.

8. The method of producing the rolling bearing device for a wheel as claimed in claim 3, wherein the inner ring includes an inner shaft,
wherein the inner shaft includes a shaft part,
wherein the shaft part comprises a cylindrical shape,
wherein the shaft part includes the brake disk mounting flange,
wherein the brake disk mounting flange is disposed at one end of the shaft part in the axial direction,
wherein an inner ring raceway member is engaged with an outer periphery of the shaft part,
wherein the inner ring raceway member includes a raceway surface, and
wherein the raceway surface is disposed on an outer peripheral surface of the inner ring raceway surface.

9. The method of producing the rolling bearing device for a wheel as claimed in claim 2, wherein a rotation center axis of the annular grinding wheel is inclined at a predetermined angle with respect to the center axis of the outer ring or the inner ring.

10. The method of producing the rolling bearing device for a wheel as claimed in claim 3, wherein a rotation center axis of the annular grinding wheel is inclined at a predetermined angle with respect to the center axis of the outer ring or the inner ring.

11. The method of producing the rolling bearing device for a wheel as claimed in claim 4, wherein a rotation center axis of the annular grinding wheel is inclined at a predetermined angle with respect to the center axis of the outer ring or the inner ring.

12. The method of producing the rolling bearing device for the wheel as claimed in claim 1, wherein, after the grinding of the brake disk mounting surface, the brake disk mounting surface is center concave in shape.

13. The method of producing the rolling bearing device for a wheel as claimed in claim 1, wherein the preparing of the rolling bearing device rolling bearing device further comprises securing the rolling bearing device with a cup-shaped jig, the cup-shaped jig being secured to a side of the rolling bearing device opposite the brake disk mounting surface.

14. The method of producing the rolling bearing device for the wheel as claimed in claim 1, wherein the distance between the grinding surface and the brake disk mounting surface continuously increases in the direction from the annular recess of the brake disk mounting surface toward the outer edge of the brake disk mounting surface.

* * * * *